US011381559B2

(12) United States Patent
Raje et al.

(10) Patent No.: US 11,381,559 B2
(45) Date of Patent: *Jul. 5, 2022

(54) BATCH REGISTRATION AND CONFIGURATION OF DEVICES

(71) Applicant: Amazon Technologies, Inc., Seattle, WA (US)

(72) Inventors: Surabhi Raje, Seattle, WA (US); Krishnamurthy Ganesan, Redmond, WA (US); Yu-Hsiang Cheng, Bothell, WA (US); Ruoyu Fei, Kirkland, WA (US); Jingyu Ji, Seattle, WA (US); Milo Oostergo, Issaquah, WA (US); Aapo Juhani Laitinen, Seattle, WA (US); Collin Charles Davis, Seattle, WA (US); Karthik Bellur, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,345

(22) Filed: Jul. 2, 2020

(65) Prior Publication Data
US 2020/0336482 A1 Oct. 22, 2020

Related U.S. Application Data

(63) Continuation of application No. 15/456,750, filed on Mar. 13, 2017, now Pat. No. 10,708,265.

(51) Int. Cl.
H04L 9/40 (2022.01)
G06F 9/445 (2018.01)
(Continued)

(52) U.S. Cl.
CPC .......... *H04L 63/0876* (2013.01); *G06F 3/167* (2013.01); *G06F 9/4411* (2013.01);
(Continued)

(58) Field of Classification Search
CPC ............. H04L 63/0876; H04L 63/0823; H04L 67/306; H04W 12/37; H04W 12/0431;
(Continued)

(56) References Cited

U.S. PATENT DOCUMENTS 9,319,409 B2 4/2016 Pollock
9,357,385 B2 5/2016 Benoit et al.
(Continued)

FOREIGN PATENT DOCUMENTS

EP 3086506 10/2016
WO 2016094122 6/2016

OTHER PUBLICATIONS

Grant Clouser, "What Is Alexa? What Is the Amazon Echo, and Should You Get One?", TheWirecutter.com, Feb. 10, 2017. Retrieved from: http://thewirecutter.com/reviews/what-is-alexa-what-is-the-amazon-echo-and-should-you-get-one/, pp. 1-18.
(Continued)

Primary Examiner — Henry Tsai
Assistant Examiner — Harry Z Wang
(74) Attorney, Agent, or Firm — Robert C. Kowert; Kowert, Hood, Munyon, Rankin & Goetzel, P.C.

(57) ABSTRACT

Methods, systems, and computer-readable media for batch registration and configuration of devices are disclosed. A plurality of devices are detected over one or more networks. Data indicative of the plurality of devices is provided through a user interface. Through the user interface, user input is received that indicates a selected plurality of the devices. The selected plurality of the devices are registered with a service provider environment. The selected plurality
(Continued)

of the devices are authenticated using device-specific credentials and registered for device-specific accounts with the service provider environment. A configuration profile is deployed to the selected plurality of the devices.

20 Claims, 10 Drawing Sheets

(51) Int. Cl.
| | |
|---|---|
| H04N 21/6547 | (2011.01) |
| G06F 9/4401 | (2018.01) |
| H04L 67/306 | (2022.01) |
| G06F 3/16 | (2006.01) |
| H04W 92/08 | (2009.01) |
| H04W 48/18 | (2009.01) |
| H04W 48/16 | (2009.01) |
| H04W 12/06 | (2021.01) |
| G06F 21/35 | (2013.01) |
| H04W 12/37 | (2021.01) |
| H04W 12/0431 | (2021.01) |
| G10L 15/22 | (2006.01) |
| H04W 12/71 | (2021.01) |

(52) U.S. Cl.
CPC ...... *G06F 9/44505* (2013.01); *G06F 9/44542* (2013.01); *G06F 21/35* (2013.01); *H04L 63/0823* (2013.01); *H04L 67/306* (2013.01); *H04N 21/6547* (2013.01); *H04W 12/0431* (2021.01); *H04W 12/06* (2013.01); *H04W 12/37* (2021.01); *H04W 48/16* (2013.01); *H04W 48/18* (2013.01); *H04W 92/08* (2013.01); *G08C 2201/31* (2013.01); *G10L 2015/223* (2013.01); *H04W 12/71* (2021.01)

(58) Field of Classification Search
CPC ..... H04W 12/06; H04W 48/16; H04W 48/18; H04W 92/08; H04W 12/71; G06F 3/167; G06F 9/4411; G06F 9/44505; H04N 21/6547; G08C 2201/31; G10L 2015/223
See application file for complete search history.

(56) References Cited

U.S. PATENT DOCUMENTS

| | | | |
|---|---|---|---|
| 9,521,642 | B2 | 12/2016 | Benoit et al. |
| 9,548,053 | B1 | 1/2017 | Basye et al. |
| 10,193,753 | B1 | 1/2019 | Tabet et al. |
| 10,708,265 | B2 | 7/2020 | Raje et al. |
| 2013/0318343 | A1 | 11/2013 | Bjarnason et al. |
| 2015/0347114 | A1 | 12/2015 | Koon |
| 2016/0065653 | A1* | 3/2016 | Chen ................ H04L 67/34 715/735 |
| 2016/0077791 | A1 | 3/2016 | Gossain et al. |
| 2016/0088438 | A1 | 3/2016 | O'Keeffe |
| 2016/0100206 | A1 | 4/2016 | Beckhardt et al. |
| 2016/0103424 | A1* | 4/2016 | Shin ................ G06Q 10/109 368/29 |
| 2016/0105418 | A1 | 4/2016 | Zhang et al. |
| 2016/0132031 | A1 | 5/2016 | Kozura et al. |
| 2016/0180222 | A1 | 6/2016 | Sierhuis et al. |
| 2016/0182513 | A1 | 6/2016 | Pollock |
| 2016/0284207 | A1 | 9/2016 | Hou et al. |
| 2017/0040018 | A1 | 2/2017 | Tormey |
| 2017/0055126 | A1 | 2/2017 | O'Keeffe |
| 2017/0359343 | A1* | 12/2017 | Sterl ................ H04W 12/069 |
| 2018/0019929 | A1* | 1/2018 | Chen ................ H04L 41/145 |
| 2018/0091506 | A1 | 3/2018 | Chow et al. |
| 2018/0096690 | A1* | 4/2018 | Mixter ................ G06F 3/167 |

OTHER PUBLICATIONS

International Search Report and Written Opinion from PCT/US2018/021469, dated May 18, 2018, Amazon Technologies Inc, pp. 1-12.
Office Action in Chinese Application No. 201880018293.2 dated Apr. 16, 2021, Amazon Technologies, Inc., pp. 1-16.

\* cited by examiner

BATCH REGISTRATION AND CONFIGURATION OF DEVICES

This application is a continuation of U.S. patent application Ser. No. 15/456,750, filed Mar. 13, 2017, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Such services may be said to reside "in the cloud."

The types of devices that can access cloud-based services continue to expand and diversify, including, for example, desktop computing devices, mobile devices such as smartphones and tablets, voice-capturing devices, home automation devices, and various other types of network-capable devices that are part of the "Internet of Things (IoT)." By accessing cloud-based services, a diverse universe of devices may access additional functionality or computing power not available locally on the devices.

Figure 1:
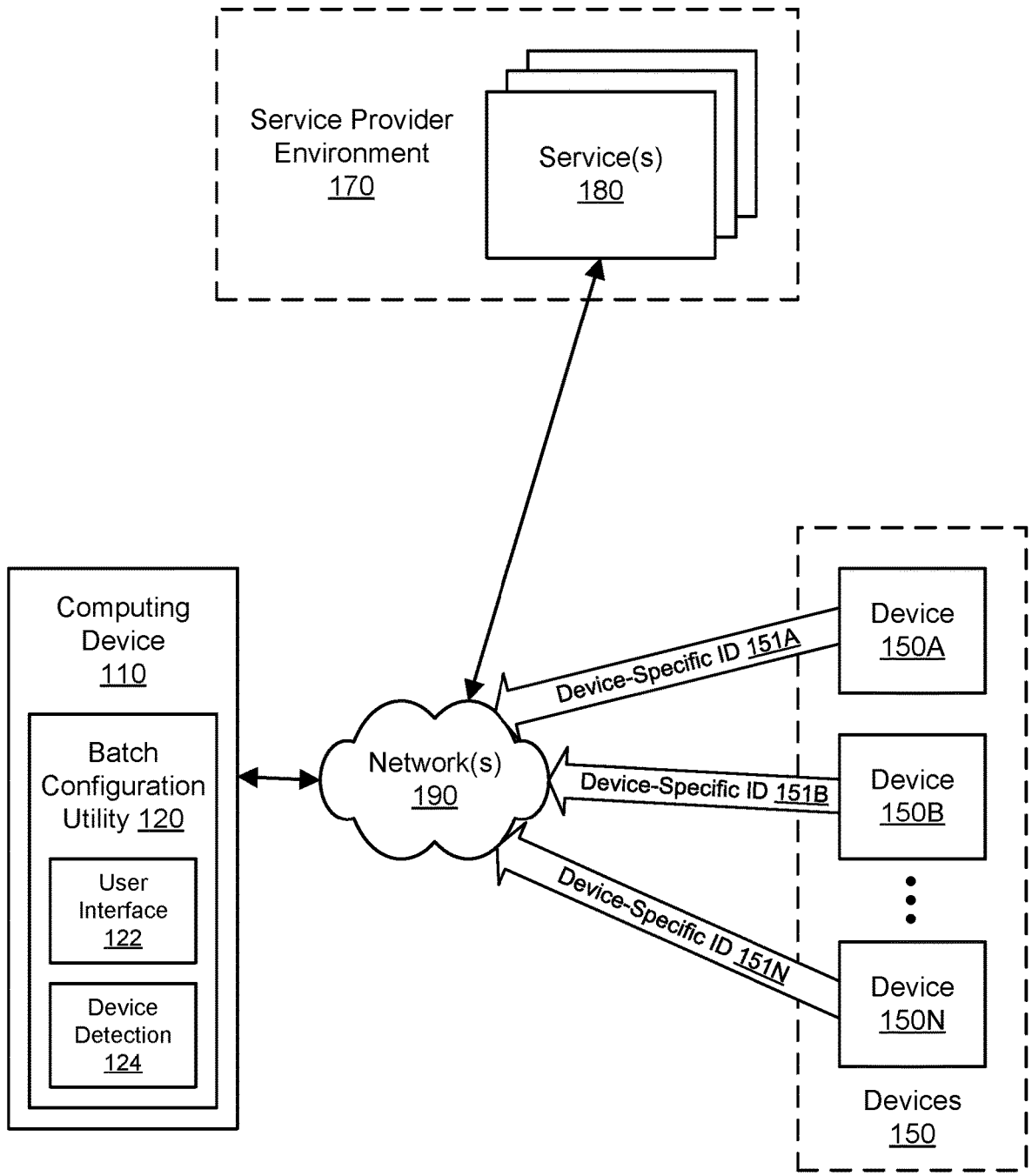
FIG. 1 illustrates an example system environment for batch registration and configuration of devices, including detection of devices over one or more wireless networks, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for batch registration and configuration of devices are described. Using the techniques described herein, a set of devices may be registered and/or configured in bulk. The devices may include voice-capturing devices or smart speakers as well as other home automation and/or "Internet of Things" devices. The devices may include networking interfaces for accessing Wi-Fi and/or other suitable wireless or wired networks. The devices may be configurable to access one or more services provided by a cloud-based service provider environment, such as a network-accessible voice-based service that responds to voice input streamed from one of the devices. A computing device such as a desktop computer, laptop computer, smartphone, or tablet may run a configuration utility that implements batch registration and configuration of such devices. The utility may scan one or more networks to detect suitable devices. The detected devices may be broadcasting their device-specific identifiers while in setup mode, and the utility may determine a set of configurable devices based on their identifiers. The utility may display a list or other visualization of the configurable devices in the vicinity. After receiving user input selecting a set of the configurable devices and one or more configuration parameters, the utility may register the selected devices with the service provider environment and deploy a configuration profile to the selected devices. In one embodiment, the devices may be registered using device-specific accounts maintained by the service provider environment, and the device-specific accounts may be distinct or independent from an account or login credential associated with the user of the configuration utility. The configuration profile may include a wireless network credential, a "wake word" to activate voice capture, a time zone, and/or other suitable configuration parameters to be stored on the devices. In one embodiment, the utility may also modify configuration parameters (e.g., a set of "skills" accessible to a smart speaker) in the cloud-based service provider environment. Using the techniques described herein, many wireless devices may be registered and configured quickly and efficiently in a single batch rather than on a time-consuming individual basis, and the registration may be independent of a user's login credential.

FIG. 1 illustrates an example system environment for batch registration and configuration of devices, including detection of devices over one or more wireless networks, according to one embodiment. Using a batch configuration utility 120, a plurality of devices 150 may be registered with a service provider environment 170 and configured automatically and in a batch rather than manually and individually. As shown for purposes of illustration and example, the devices 150 may include devices 150A and 150B through 150N. In various embodiments, the devices 150 may be heterogeneous or homogeneous in terms of their device type and/or vendor. The devices 150 may include various types of electronic devices, digital devices, and/or computing devices. The devices 150 may include voice-capturing devices or smart speakers as well as other home automation and/or "Internet of Things" devices. In one embodiment, the devices 150 may include wireless and/or wired networking interfaces for accessing Wi-Fi and/or other suitable wireless and/or wired networks. In one embodiment, some types of the devices 150, such as smart speakers, may lack a graphical display capability (e.g., a display suitable for implementing a graphical user interface) and a physical input capability (e.g., a keyboard or touchscreen) that could be used to interact with the device for device registration and/or configuration.

The devices may be configurable to access one or more resources and/or services provided by a cloud-based service provider environment 170. The service provider environment 170 may include various components that are owned or managed by one or more entities or organizations called service providers. The components of the service provider environment 170 may be located in one or more data centers and in one or more geographical locations. The service provider environment 170 may include and/or offer a plurality of services 180, and the services 180 may perform various functions or operations. In various embodiments, some of the services 180 may be accessed by the devices 150 while others of the services may be accessed only by other services and not directly by the devices. The services 180 may be implemented according to a service-oriented architecture (SOA) in which services exchange requests and responses to perform complex operations. In one embodiment, the services 180 may include a network-accessible, voice-based service. One or more of the devices 150 may include voice-capturing devices (also referred to as a voice-capturing endpoint) and/or "smart speakers" that are configurable to stream voice input to the network-accessible voice-based service provided by the service provider environment 170. In response, the voice-based service may take one or more actions and/or stream voice output back to the originating device for playback on that device. The actions and/or voice output may vary based on the resources and/or services 180 of the service provider environment 170, also referred to herein as skills, that are accessible to the device. In various embodiments, the skills provided by the service provider environment 170 may include, for example, scheduling conference calls; identifying a speaker during a conference call; acting as a scheduling assistant; providing calendaring services, recording a meeting; accessing calendars, phone directories, or e-mail; creating, scheduling, and/or modifying tasks; and so on. In one embodiment, some of the devices 150 may be satellite devices that are configured to connect to a central device over a wireless local area network, e.g., to stream voice input to the central device, and the central device may then connect to the service provider environment 170. By accessing cloud-based services 180 of the service provider environment 170, the devices 150 may access additional functionality or computing resources not available locally on the devices.

The batch configuration utility 120, also referred to as a device configuration tool or device configuration program, may be executed (at least in part) using a computing device 110 such as a desktop computer, a laptop computer, a smartphone, a tablet, or any other suitable computing device. The utility 120 may be implemented using program instructions that are executable on the computing device 110 to perform various functions. In one embodiment, at least some of the functionality of the utility 120 may be implemented "in the cloud" in the service provider environment 170, and the computing device may include program instructions (e.g., browser software) enabling a user to access that functionality. In one embodiment, the utility 120 may include a user interface 122. The user interface 122 may include distinct pages or other interfaces such as a login interface, a device discovery interface, a device configuration interface, and so on, in order to present information to the user and accept various types of user input.

The computing device 110 and/or devices 150 may convey network-based service requests to the service provider environment 170 via one or more networks. In one embodiment, the computing device 110 and the devices 150 may communicate via one or more networks 190, such as one or more Wi-Fi networks or other types of wireless local area networks (WLANs). The network(s) 190 may be implemented using any suitable wireless communication technologies and any suitable configuration of networking components, such as one or more wireless routers. In one embodiment, the computing device 110 and devices 150 may also communicate via one or more networks 190 representing wired networks over a transmission medium such as Ethernet. In various embodiments, the network(s) 190 may encompass any suitable combination of networking hardware and protocols necessary to establish network-based communications between client devices 110A-110N, devices 150, and services 180. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. In one embodiment, the network(s) 190 may include the hardware (e.g., modems, routers, switches, load balancers, proxy servers, etc.) and software (e.g., protocol stacks, accounting software, firewall/security software, etc.) necessary to establish a networking link between two particular components. In one embodiment, the computing device 110 and/or devices 150 may be able to communicate with the services 180 using a private network rather than the public Internet. In one embodiment, the network(s) may include Bluetooth connections between components or other component-to-component connection functionality.

In one embodiment, the utility 120 may include a device detection component 124. Using the device detection component 124, the utility 120 may detect or discover a set of configurable devices 150 that are accessible over the network(s) 190. If the devices 150 are detected over a wireless network, then due to wireless networking limitations, the detected devices 150 may be located within a particular geographical range of the computing device 110 that runs the configuration utility 120. In one embodiment, in order to be detected, the devices 150 may broadcast a device-specific identifier on the one or more networks 190. As shown in the example of FIG. 1, device 150A may broadcast its device-specific identifier 151A on the network(s) 190, device 150B may broadcast its device-specific identifier 151B on the network(s), and device 150N may broadcast its device-specific identifier 151N on the network(s). In one embodiment, the devices 150 may be designed to broadcast their identifiers while in a setup mode. In various embodiments, the devices 150 may automatically enter the setup mode prior to registration, or the devices may be individually placed into the setup mode by operation of an administrator or other user.

In one embodiment, the identifiers 151A-151N may include one or more service set identifiers (SSID) broadcast on one or more wireless networks 190. In one embodiment, the identifiers 151A-151N may include a vendor-specific or device-type-specific component, such as a prefix or suffix to the SSID that identifies a vendor of the device or the device type. In one embodiment, the identifiers 151A-151N may include a device-specific component, such as a prefix or suffix to the SSID that includes one or more elements of a device serial number. The device serial numbers may be globally unique. In one embodiment, the identifiers 151A-151N may include a vendor-specific and/or device-type-specific component as well as a device-specific component. The configuration utility 120 may analyze the device-specific identifiers 151A-151N and determine, based at least in part on the identifiers, which of the corresponding devices 150A-150N are deemed suitable for configuration. For example, the configuration utility 120 may deem a device to be configurable only if its vendor and/or device type are compatible with the utility and/or if the user of the utility has suitable access privileges to register and configure such devices.

The utility 120 may display data indicative of the configurable devices 150 in the user interface 122. The user interface 122 may include one or more interface elements that permit a user to select one or more of the devices. For example, the user interface 122 may list each of the device-specific identifiers 151A-151N for the configurable devices with its own individual checkbox, and potentially with "select all" and/or "deselect all" buttons. The user interface 122 may accept user input that represents a selection of a plurality of the configurable devices 150. The selection may include all of the configurable devices in the vicinity or may instead exclude one or more of them from the selection. In one embodiment, all of the configurable devices may be selected by default, and user input may be received in the configuration utility 120 to accept the default selection. In one embodiment, after receiving the input to select the devices (and potentially after receiving user input to define any configuration parameters to deploy), registration and configuration of the devices may be initiated or performed automatically (e.g., without necessarily requiring or being responsive to additional user input) and programmatically (e.g., by execution of program instructions). The user command to automatically register and configure a batch of selected devices may be associated with a button or other interface element with a label such as "provision devices" or "configure devices." In various embodiments, the devices 150 may be automatically registered and configured in serial or in parallel, e.g., depending on the ability or inability of the computing device 110 that runs the configuration utility 120 to access more than one of the devices at a time.

In one embodiment, the configuration of a device may include creating and/or modifying a device-specific account to reflect registration and/or deployment of the device. Device-specific accounts may be maintained by the service provider environment 170, and the device-specific accounts may be distinct or independent from an account or login credential associated with the user of the configuration utility. In one embodiment, the configuration of a device may include storing values for configuration parameters with the device-specific account. The values for the configuration parameters may be stored in a configuration profile associated with the device-specific account, and the corresponding device may be operated in accordance with the configuration profile. For example, the configuration profile stored in the service provider environment 170 may include a wireless network credential, a "wake word" or other user prompt to activate voice capture, a time zone, an indication of skills that are accessible to the device, and/or other suitable configuration parameters. At least some of the configuration parameter values may be provided using the configuration utility 120. In one embodiment, the configuration of a device may include providing values for at least some of the configuration parameters to the device itself for storage in memory locally accessible to the device. For example, the configuration parameter values deployed to a device may include a wireless network credential, a wake word or other user prompt to activate voice capture, a time zone, and/or other suitable configuration parameters. By deploying the wireless network credential to the device, the device may be usable with a particular wireless local area network, e.g., to interact with voice-based services and skills in the service provider environment. By deploying a selected wake word or other prompt to the device, the device may be usable to perform selective voice capture.

In one embodiment, at least some of the functionality of the utility 120 may be implemented in one or more of the devices 150. One of the devices 150, such as device 150N, may be configured (and potentially registered with the service provider environment 170) in any suitable way, such as by using the utility 120 on the computing device 110. The configured device 150N may then be used to push the same configuration profile to others of the devices 150. In one embodiment, similar functionality from the user interface 122 may be implemented in the device 150N, e.g., using a voice-based interface. For example, the user may issue a voice command to the device 150N to discover other devices (e.g., on a local wireless network), and the device may recite a list of configurable devices using computer-generated speech generated by the voice-based service in the service provider environment 170. The user may then provide suitable voice input to select the devices that are sought to be configured. From that point, the device 150N may register and configure the other devices in a similar manner as discussed herein with respect to the utility 120 on the computing device 110.

Figure 10:
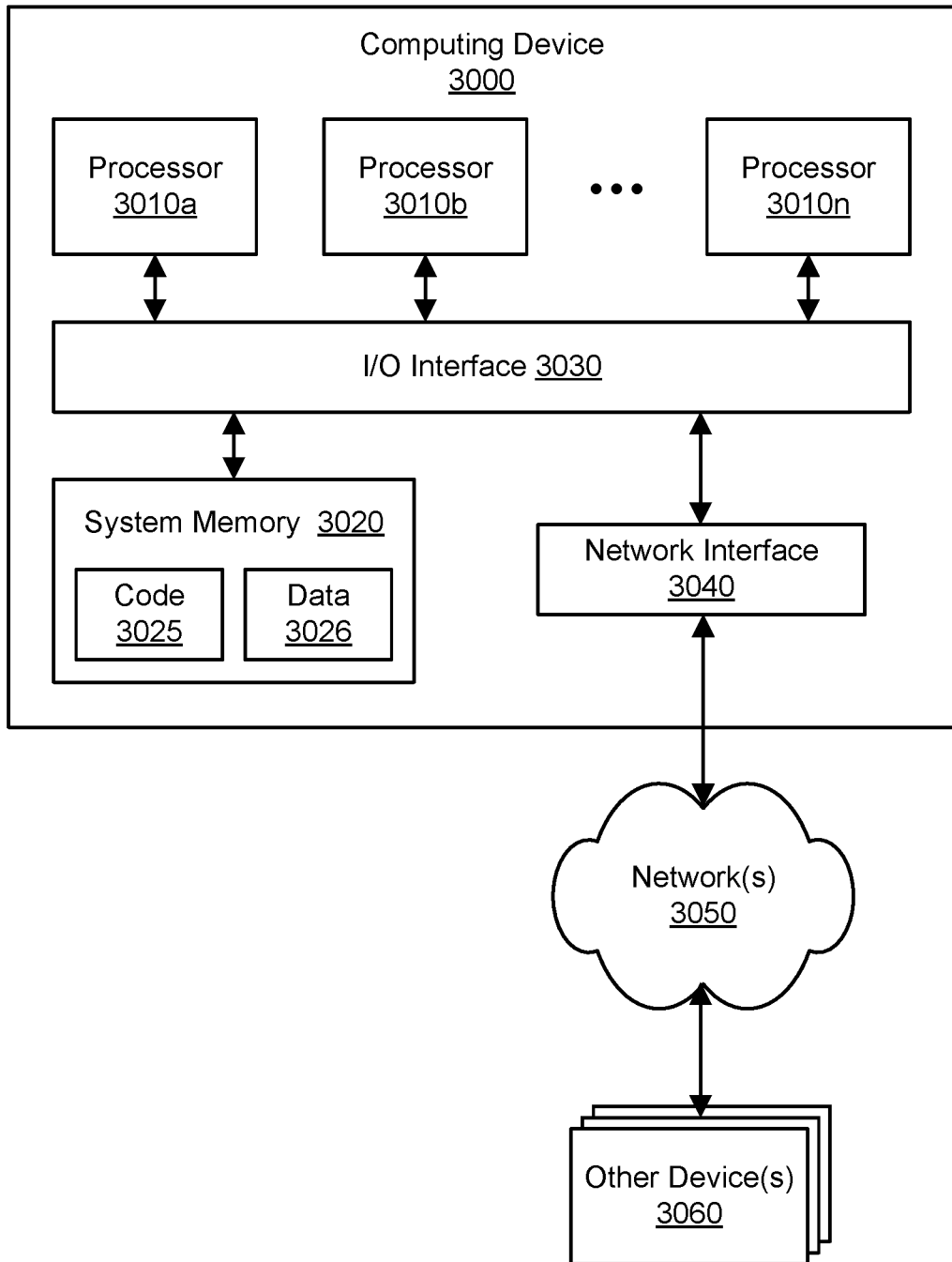
FIG. 10 illustrates an example computing device that may be used in some embodiments.

The computing device 110 that executes the configuration utility 120 may be implemented by the example computing device 3000 illustrated in FIG. 10. In some embodiments, one or more of the devices 150 may be implemented by the example computing device 3000 illustrated in FIG. 10. The service provider environment 170 may include a plurality of computing devices, any of which may be implemented by the example computing device 3000 illustrated in FIG. 10.

In various embodiments, portions of the described functionality of the configuration utility 120 and service(s) 180 may be provided by the same computing device or by any suitable number of different computing devices. If any of the components of the configuration utility 120 and service(s) 180 are implemented using different computing devices, then the components and their respective computing devices may be communicatively coupled, e.g., via one or more networks 190. Each of the illustrated components may represent any combination of software and hardware usable to perform their respective functions. It is contemplated that the computing device 110, devices 150, service provider environment 170, and networking infrastructure 190 may include additional components not shown, fewer components than shown, or different combinations, configurations, or quantities of the components shown.

Figure 2:
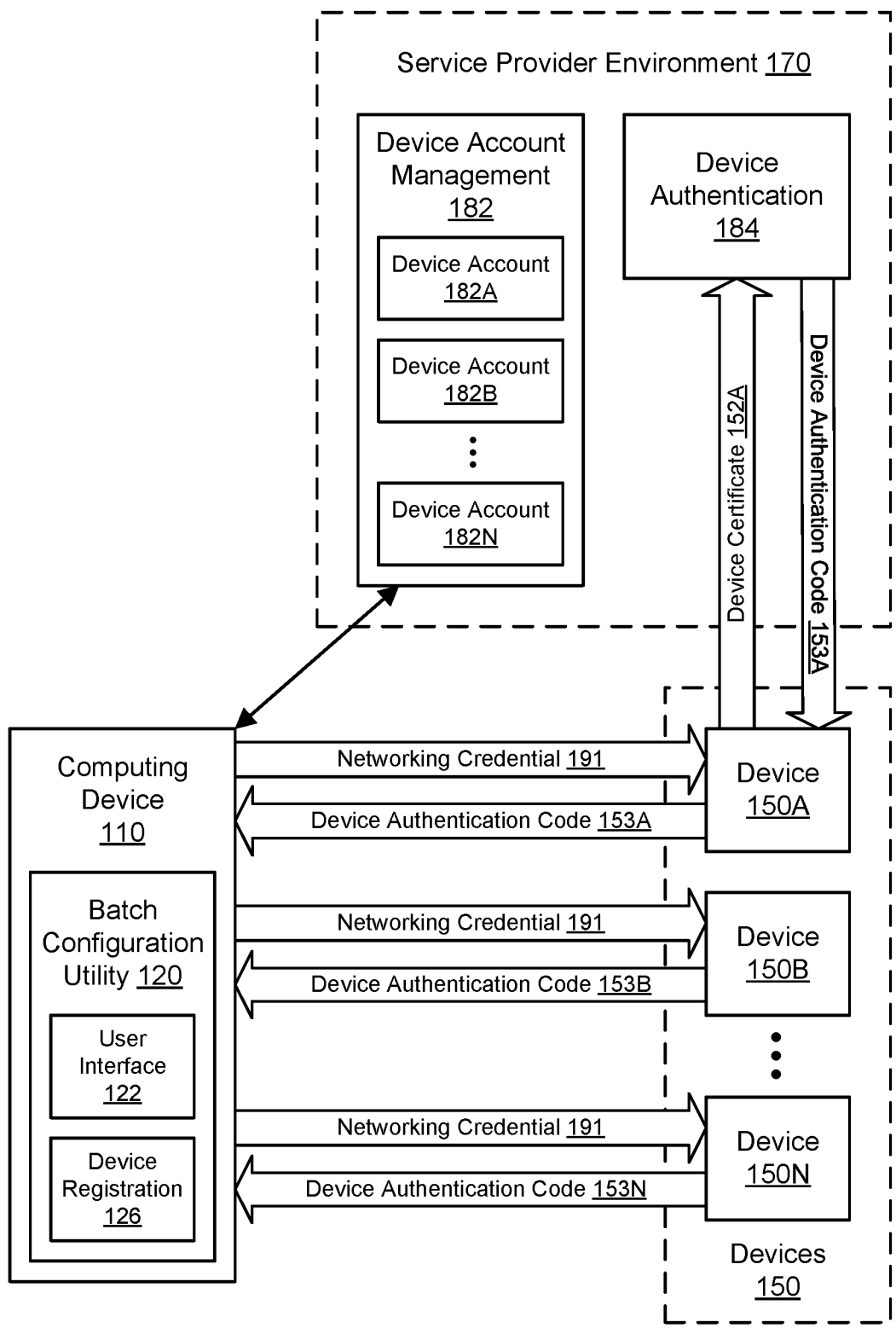
FIG. 2 illustrates further aspects of the example system environment for batch registration and configuration of devices, including registration of authenticated devices, according to one embodiment.

FIG. 2 illustrates further aspects of the example system environment for batch registration and configuration of devices, including registration of authenticated devices, according to one embodiment. As discussed above, after receiving the input to select the devices (and potentially after receiving user input to define any configuration parameters to deploy), registration of the devices may be initiated or performed automatically (e.g., without necessarily requiring additional user input) and programmatically (e.g., by execution of program instructions). The user command to initiate registration of a batch of selected devices may be associated with a button or other interface element with a label such as "provision devices" or "configure devices." In various embodiments, the devices 150 may be registered in serial or in parallel, e.g., depending on the ability or inability of the computing device 110 that runs the configuration utility 120 to access more than one of the devices at a time. In one embodiment, after the devices 150 are selected for registration and configuration, a networking credential 191 (e.g., a password to access one or more networks) may be deployed to the selected devices 150A-150N by the configuration utility 120. In various embodiments, the networking credentials may be the same for the devices 150 or may instead vary from device to device, e.g., such that the various networking credentials may be specific to device certificates.

The configuration utility 120 may include a device registration component 126. Using the device registration component 126, selected devices 150A-150N may be authenticated for use with the service provider environment 170. In one embodiment, the devices 150 may include credentials such as certificates, e.g., as installed by a vendor of the device and usable to enable access to a service provider environment associated with that vendor. In the registration process, a device may provide its certificate to a backend service of the service provider environment, such as the device authentication service 184, which may then determine whether the device is entitled to access the service provider environment. The certificate may be provided by the device upon the device being prompted to do so by the configuration utility. Upon determining that the certificate is valid, the device authentication service 184 may generate a link code that is usable to register the device for a particular window of time. The link code may also be referred to as a device authentication code. The device authentication service 184 may provide the link code for the device to the configuration utility 120, either directly or by using the device itself as an intermediary. For example, as shown in FIG. 2, the device 150A may send its device certificate 152A (or information pertaining to the certificate) to the device authentication service 184, which, upon verification of the certificate, may respond with a device authentication code 153A. The device 150A may send its device authentication code 153A to the configuration utility 120 to authenticate the device 150A. Similarly, the device 150B may send its device authentication code 153B to the configuration utility 120, and the device 150N may send its device authentication code 153N to the configuration utility 120. The configuration utility 120 may validate the device authentication codes using locally executed program code and/or by accessing an authentication service in the service provider environment 170 (such as service 184). The configuration utility 120 may proceed with registration and configuration of a device based at least in part on receipt of a valid device authentication code. If authentication of a device fails, then registration and configuration of the device may not be attempted.

Using the device registration component 126, selected devices (such as devices 150A-150N) may be registered with one or more entities of a service provider environment 170. In one embodiment, at least some of the functionality of the device registration component 126 may be implemented in the devices 150. Based on the registration, the devices 150 may be permitted to access one or more cloud-based resources and/or services provided by the service provider environment 170. For example, a voice-capturing device or smart speaker may be configurable to stream voice input to a network-accessible voice-based service provided by the service provider environment 170, and in response, the voice-based service may take one or more actions and/or stream voice output back to the device.

In one embodiment, a device account management service or component 182 in the service provider environment 170 may maintain individual, device-specific accounts for the devices 150A-150N. As shown in the example of FIG. 2, one device-specific account 182A may be created or maintained which corresponds to device 150A, another device-specific account 182B may be created or maintained which corresponds to device 150B, and yet another device-specific account 182N may be created or maintained which corresponds to device 150N. Registration of a device by the device registration component 126 may include providing an identifier of an authenticated device, such as the device-specific identifier or the device serial number, to one or more backend services of the service provider environment 170, such as the device account management service 182. The device-specific accounts may be associated with the devices on a one-to-one basis and not necessarily with a particular user. In one embodiment, the device-specific accounts may be generated in the service provider environment during the batch registration process.

In one embodiment, the device-specific accounts may be associated with device-specific account identifiers (e.g., e-mail addresses) and device-specific access credentials (e.g., passwords) permitting the devices to access the service provider environment. If the device-specific account identifiers include e-mail addresses, then the addresses may be generated for internal use in the service provider environment and may not be owned or accessible by the end users of the devices. In one embodiment, the device-specific accounts 182A-182N may be distinct or independent from an account associated with the user of the configuration utility. In one embodiment, device-specific credentials associated with the device-specific accounts 182A-182N (e.g., as derived from device certificates) may be distinct or independent from a login credential associated with the user of the configuration utility. The login credential may also be associated with a different type of account than the device-specific accounts, e.g., the login credential may provide access to one or more components of a provider network such as Amazon Web Services while the device-specific accounts may not provide such access. In one embodiment, the device-specific accounts 182A-182N may be created or activated during the registration process, e.g., after the user has selected a set of devices to configure. In one embodiment, during or after registration, the device-specific accounts may be assigned to another "umbrella" account or a pool of accounts, such as a corporate account associated with an organizational customer of the service provider environment, e.g., for ease of device management. By separating the device-specific accounts from a user account, the batch registration and configuration may be performed more efficiently and with greater flexibility. For example, the use of device-specific accounts may bypass a restriction on the number of devices that can be associated with a given user account.

Figure 3:
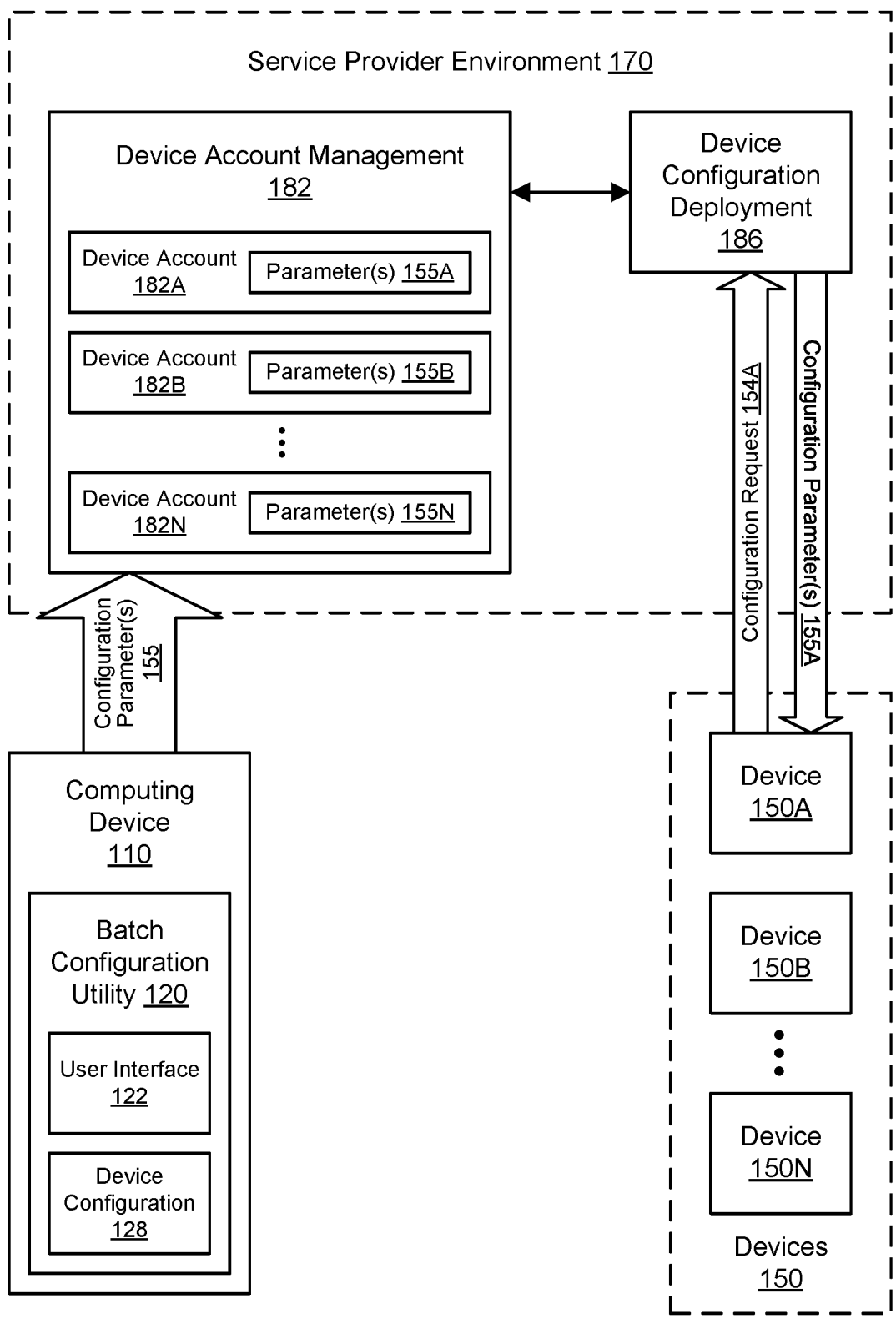
FIG. 3 illustrates further aspects of the example system environment for batch registration and configuration of devices, including deployment of configuration parameters to devices, according to one embodiment.

FIG. 3 illustrates further aspects of the example system environment for batch registration and configuration of devices, including deployment of configuration parameters to devices, according to one embodiment. As discussed above, after receiving the input to select the devices (and potentially after receiving user input to define any configuration parameters to deploy), configuration of the devices may be initiated or performed automatically (e.g., without necessarily requiring additional user input) and programmatically (e.g., by execution of program instructions). The user command to initiate configuration of a batch of selected devices may be associated with a button or other interface element with a label such as "provision devices" or "configure devices." In various embodiments, the devices 150 may be automatically configuration in serial or in parallel, e.g., depending on the ability or inability of the computing device 110 that runs the configuration utility 120 to access more than one of the devices at a time.

The configuration utility 120 may include a device configuration component 128. Using the device configuration component 128, a configuration profile (or a portion thereof) and/or its constituent one or more configuration parameters 155 may be deployed to authenticated devices 150A-150N in a batch. In various embodiments, the configuration profile may include various parameters such as a networking credential (e.g., a wireless networking credential) that permits the device to access a local area network (e.g., a Wi-Fi network), a "wake word" to activate voice capture on detection of audible speech including the word, a time zone, and/or other suitable configuration parameters to be stored on the devices. In one embodiment, the utility 120 may also modify configuration parameters maintained not on the devices but instead in the cloud-based service provider environment 170, such as an association between a voice-capturing device and a set of "skills" accessible to the device, a particular location associated with a device (e.g., a particular conference room in a particular office building), and so on. In one embodiment, one or more configuration parameters 155 for a device may be provided to the service provider environment and maintained in association with the device-specific account. As shown in the example of FIG. 3, configuration parameter(s) 155A may be associated with the device-specific account 182A corresponding to device 150A, configuration parameter(s) 155B may be associated with the device-specific account 182B corresponding to device 150B, and configuration parameter(s) 155N may be associated with the device-specific account 182N corresponding to device 150N.

In one embodiment, the same configuration profile may be deployed for all the selected devices 150A-150N. In one embodiment, different configuration profiles may be deployed for the selected devices 150A-150N, e.g., based at least in part on locations associated with the devices. In one embodiment, all or part of the configuration profile may be deployed to a device by a backend service of the service provider environment 170 and not necessarily directly from the configuration utility 120. The service provider environment 170 may be updated by the configuration utility 120 with the configuration parameters associated with a device-specific account, and one or more of those configuration parameters (e.g., the wake word, time zone, and/or other suitable parameters) may be sent to the device from the service provider environment. In one embodiment, at least a portion of the configuration profile may be deployed from the service provider environment on request from the device. For example, upon receiving a device configuration request 154A from the device 150A, a device configuration deployment service or component 186 may retrieve the relevant configuration parameter(s) 155A and send the parameter(s) to the device 150A for storage. In one embodiment, the networking credential 191 (e.g., a password to access one or more networks) may be deployed to the selected devices 150A-150N by the configuration utility 120, as shown in FIG. 2, while one or more other configuration parameters may be deployed to the devices by a backend service 186 of the service provider environment 170.

Figure 4:
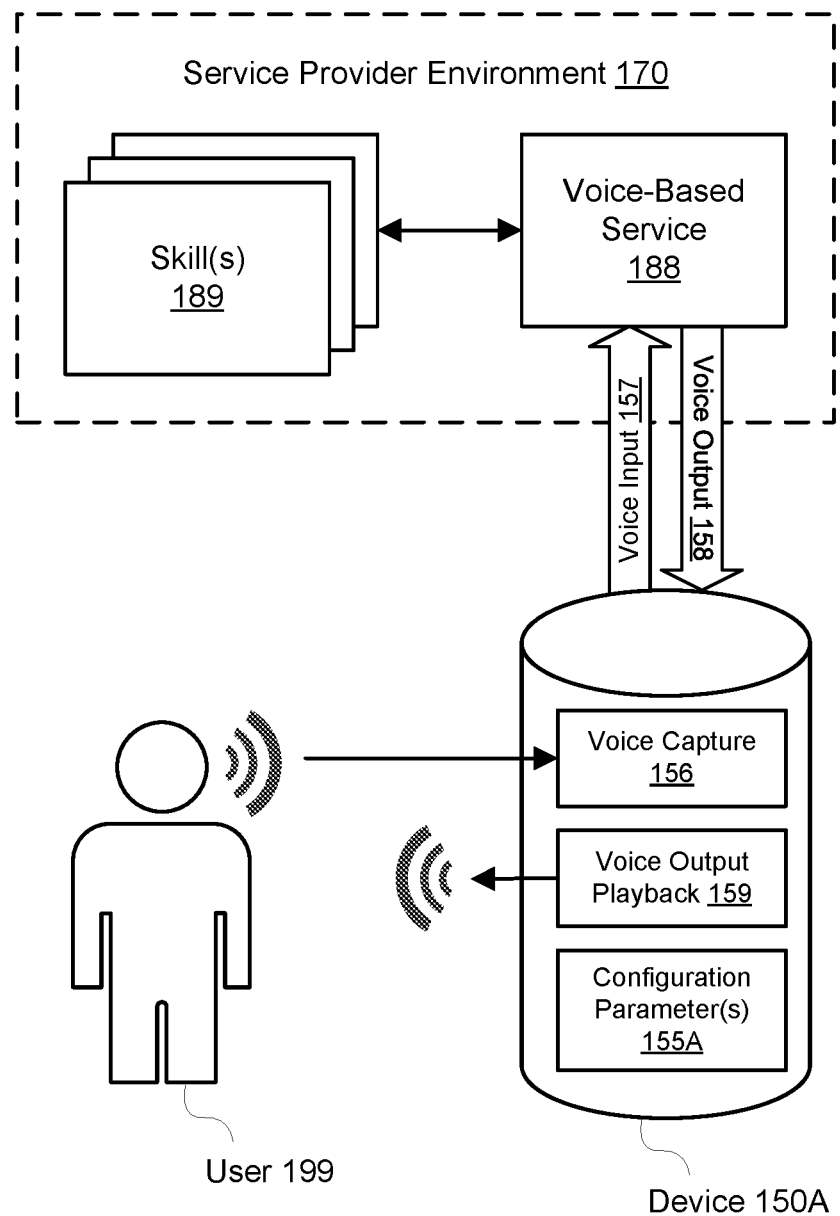
FIG. 4 illustrates further aspects of the example system environment for batch registration and configuration of devices, including use of a voice-capturing device, according to one embodiment.

FIG. 4 illustrates further aspects of the example system environment for batch registration and configuration of devices, including use of a voice-capturing device, according to one embodiment. Using the batch registration and configuration techniques discussed herein, many devices 150 may be registered and configured quickly and efficiently in a single batch rather than on a time-consuming individual basis. After batch registration and configuration, the devices may be physically deployed to various locations. For example, the batch of devices may be registered and configured in a centralized location of an office building, and individual devices may then be deployed to different locations within the same building or within other structures affiliated with the same organization. Upon deployment, the devices may be used to access the resources and/or services of the service provider environment 170, e.g., by capturing voice input and streaming the voice input to a network-accessible voice-based service.

In one embodiment, the services 180 of the service provider environment 170 may include a network-accessible, voice-based service 188. The device 150A may be a voice-capturing device (also referred to as a voice-capturing endpoint) and/or "smart speaker" that is configured to stream voice input 157 to the network-accessible voice-based service 188. The voice input 157 may be captured locally by the device 150A using a voice capture component 156 that responds to speech from a user 199. In one embodiment, the voice capture may be prompted by detection of an audible "wake word" that is one of the configuration parameter(s) 155A stored locally on the device 150A. In response to the voice input 157, the voice-based service 188 may take one or more actions and/or stream voice output 158 back to the originating device for playback to the user 199 with a voice output playback component 159 (including a speaker). The actions and/or voice output 158 may vary based on the resources and/or services 180 of the service provider environment 170, also referred to herein as skills 189, that are accessible to the device 150A. In various embodiments, the skills 189 provided by the service provider environment 170 may include, for example, scheduling conference calls; acting as a scheduling assistant; providing calendaring services; accessing calendars, phone directories, or e-mail; creating, scheduling, and/or modifying tasks; and so on.

Figure 5:
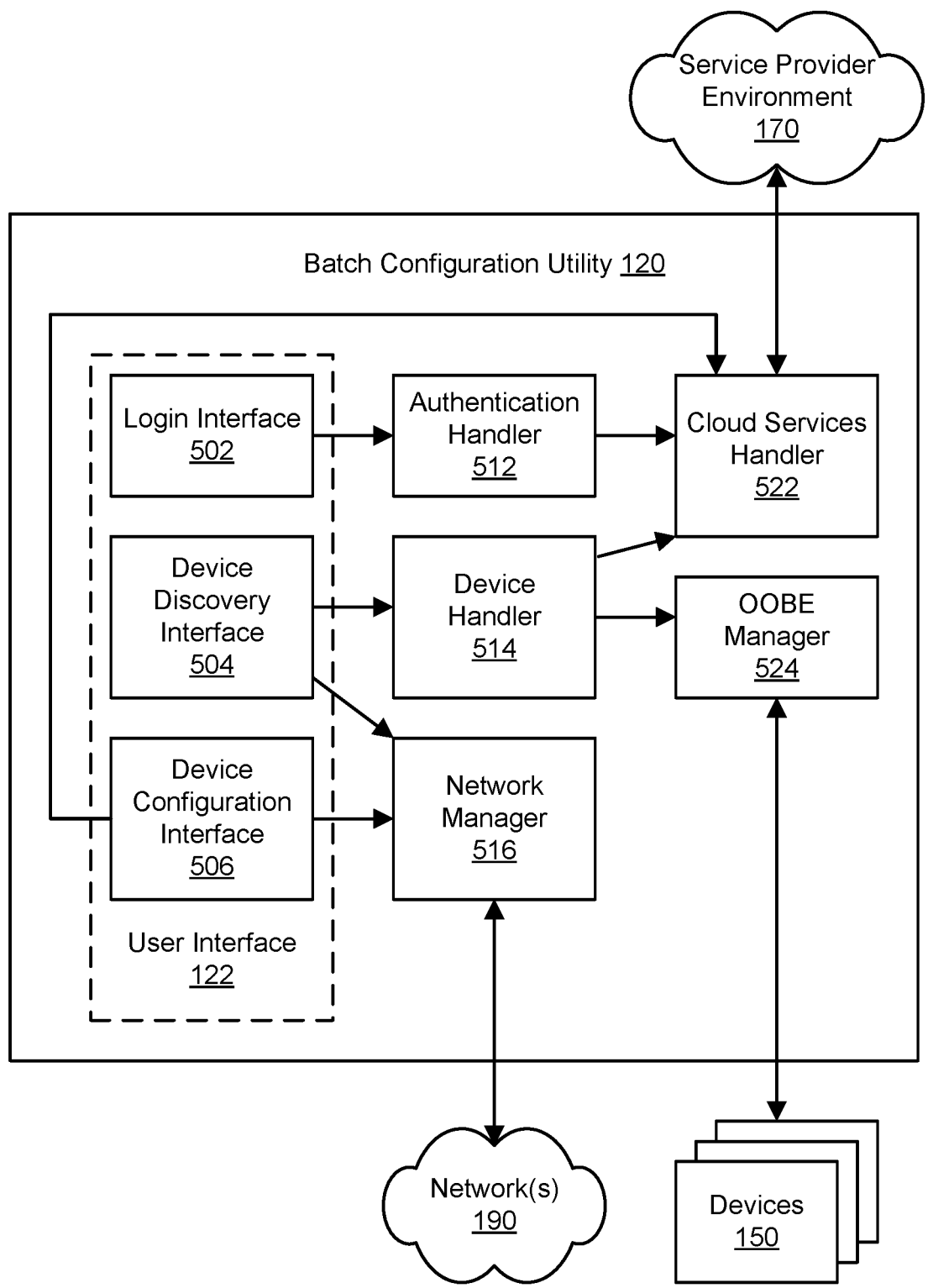
FIG. 5 illustrates further aspects of the example system environment for batch registration and configuration of devices, including components of a configuration utility, according to one embodiment.

FIG. 5 illustrates further aspects of the example system environment for batch registration and configuration of devices, including components of a configuration utility, according to one embodiment. The batch configuration utility 120 may include numerous components that work together to implement registration and configuration functionality. The user interface 122 of the utility 120 may include distinct pages or other interfaces in a graphical user interface (GUI) such as a login interface 502, a device discovery interface 504, a device configuration interface 506, and so on, in order to present information to the user and accept various types of user input. The login interface 502 may interact with an authentication handler 512 which verifies that the user has the proper access credentials. The authentication handler 512 may access a backend service to verify that the user has the desired level of access, e.g., with an administrative account or other suitable account with the service provider environment 170.

The device discovery interface 504 may interact with a device handler 514. The device handler 514 may maintain the registration status of devices 150 (e.g., with various potential statuses indicating success or failure of registration or that registration has not yet been attempted) as well as various details of devices such as the account identifier for the device-specific account, the associated location of the device, the device capabilities, and any configuration parameters. The device configuration interface 506 may interact with a network manager 516 and a cloud services handler 522. The network manager may be responsible for scanning for available networks (e.g., wireless networks), maintaining a list of connected networks or previously connected networks, providing a list of configurable devices 150 in range, and connecting to those devices over the network(s) 190. The authentication handler 512 and device handler 514 may interact with the cloud services handler 522 that handles API (application programming interface) requests to one or more backend services of the service provider environment, e.g., to request registration of a device. The device handler 514 may interact with an DOBE (Out-of-Box Experience) Handler 524 that communicates directly with the devices 150, e.g., for registration and configuration.

Figure 6:
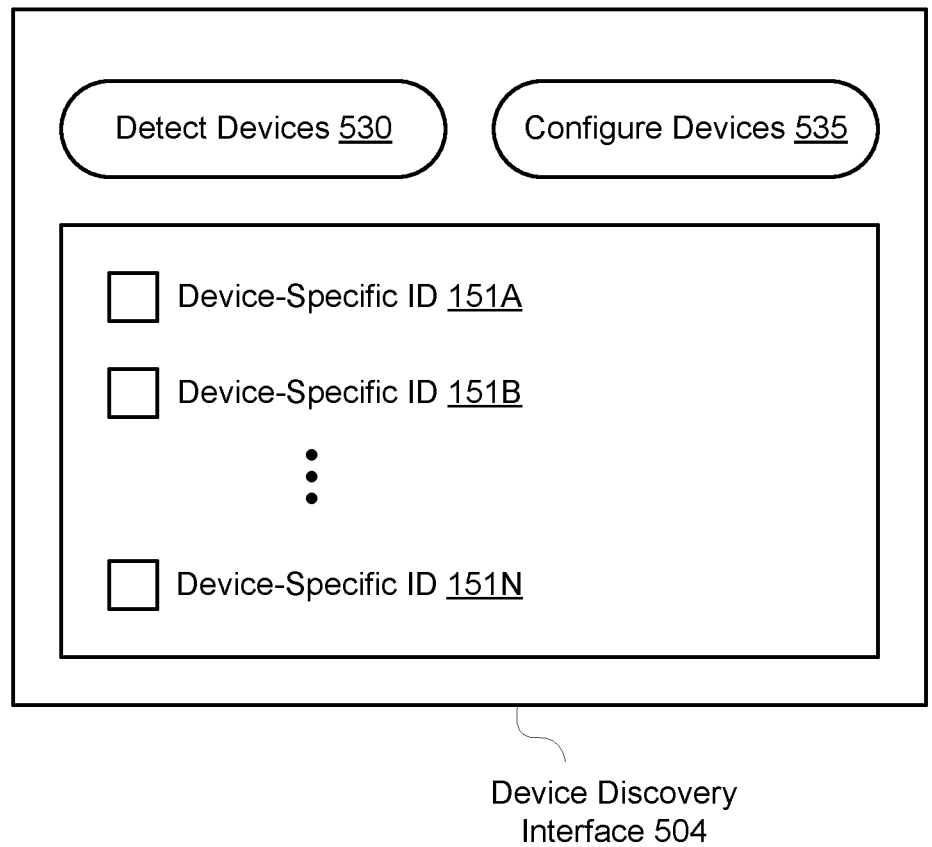
FIG. 6 illustrates an example of a user interface for batch registration and configuration of devices, according to one embodiment.

FIG. 6 illustrates an example of a user interface for batch registration and configuration of devices, according to one embodiment. In one embodiment, the device discovery interface 504 of the configuration utility 120 may include various interface elements such as a "detect devices" button 530, a "configure devices" button 535, and a list or other visualization of configurable devices that can be selected by a user. The user may press the "detect devices" button 530 to initiate device discovery on any accessible wireless network(s). The resulting set of configurable devices (e.g., devices suitable for configuration based at least in part on their vendor and/or device type, as determined by their broadcast device-specific identifiers) may be displayed in the interface 504. In the example of FIG. 6, the user may select individual checkboxes for the devices, as identified in the interface 504 by their device-specific identifiers. In one embodiment, all of the checkboxes may be automatically checked by default, and the user may choose to deselect any of the devices to exclude them from batch registration and configuration. The interface 504 may also include buttons such as "select all" and/or "deselect all." The user may then press the "detect devices" button 530 to initiate batch registration and configuration of the selected devices.

Figure 7:
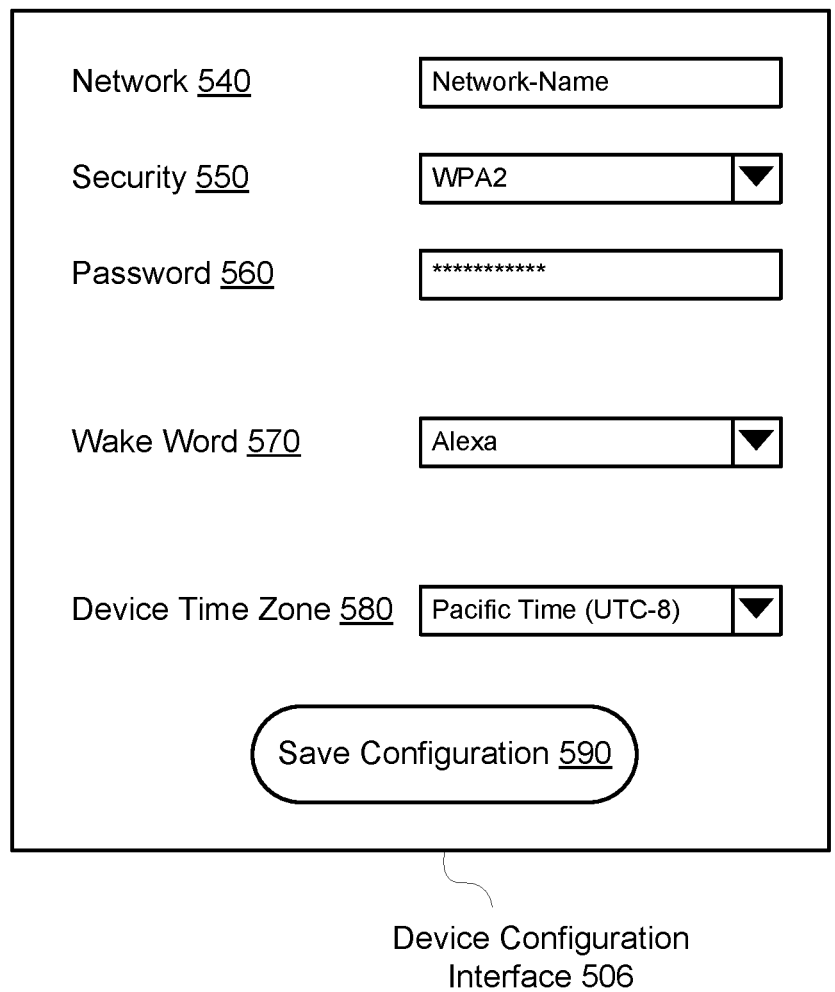
FIG. 7 illustrates an example of a user interface for batch registration and configuration of devices, according to one embodiment.

FIG. 7 illustrates an example of a user interface for batch registration and configuration of devices, according to one embodiment. In one embodiment, the device configuration interface 506 of the configuration utility 120 may include various interface elements permitting entry of configuration parameters and a "save configuration" button 590. The values specified in the device configuration interface 506 may collectively represent a configuration profile. The configuration profile may potentially be applicable to multiple devices. In one embodiment, the configuration profile may include information regarding a wireless network, such as a network name 540, a security mode 550 (e.g., WPA2), and a password 560 or other credential usable to access the network. In one embodiment, the configuration profile may include other configuration parameters such as a wake word 570 (e.g., "Computer") to initiate voice capture and a device time zone 580 (e.g., "Pacific Time (UTC-8)"). In one embodiment, the device configuration interface 506 may also permit the user to load a previously generated configuration profile.

Figure 8:
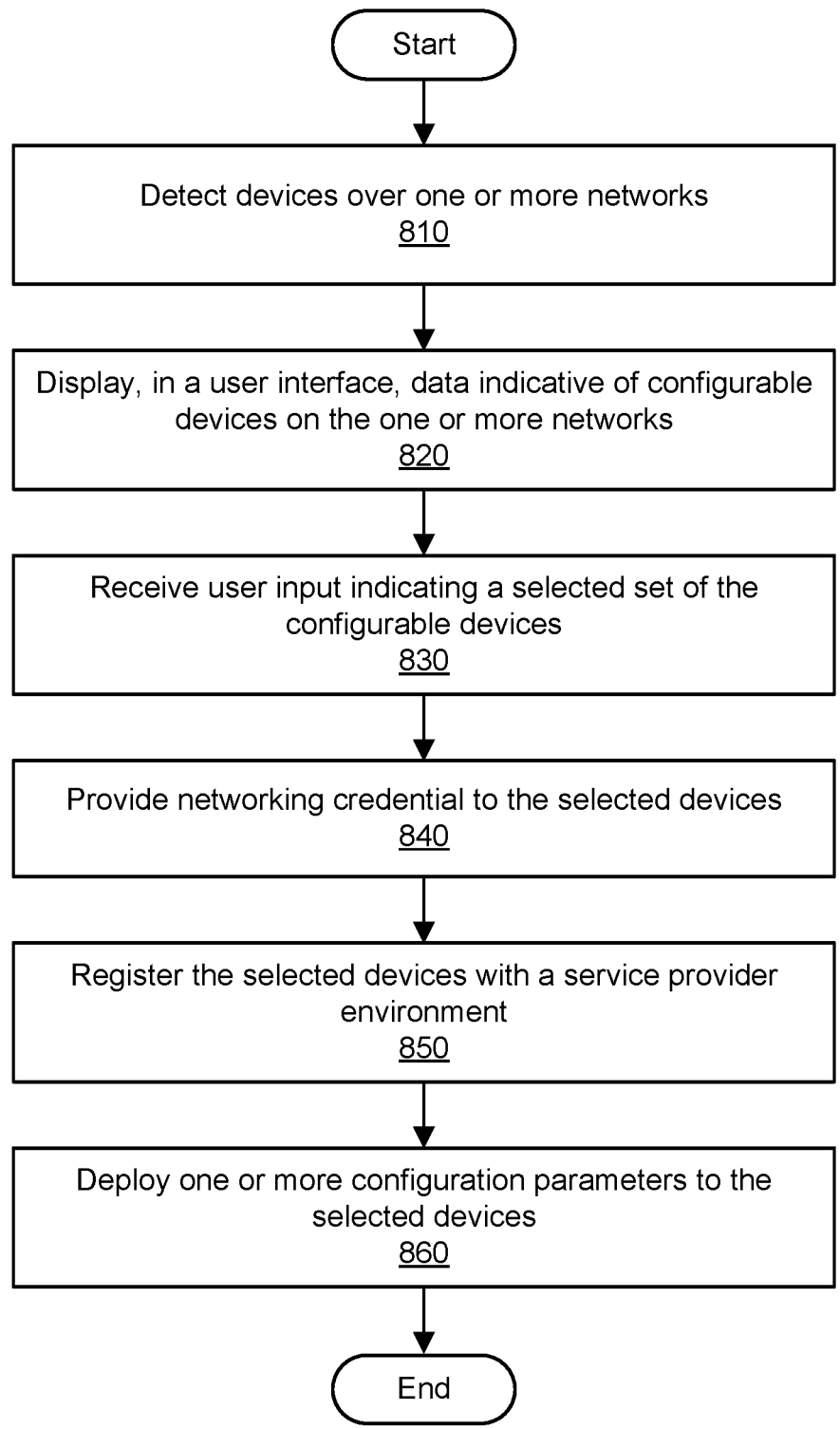
FIG. 8 is a flowchart illustrating a method for batch registration and configuration of devices, according to one embodiment.

FIG. 8 is a flowchart illustrating a method for batch registration and configuration of devices, according to one embodiment. As shown in 810, a set of devices may be detected or discovered over one or more wireless networks. The devices may include voice-capturing devices or smart speakers as well as other home automation and/or "Internet of Things" devices. The devices may include networking interfaces for accessing Wi-Fi and/or other suitable wireless and/or wired networks. Some of the devices, such as smart speakers, may lack a graphical display capability (e.g., a display suitable for implementing a graphical user interface) and a physical input capability (e.g., a keyboard or touchscreen) that could be used for device registration and/or configuration. The devices may be configurable to access one or more services provided by a cloud-based service provider environment. For example, a voice-capturing device (also referred to as a voice-capturing endpoint) or smart speaker may be configurable to stream voice input to a network-accessible voice-based service provided by a service provider environment, and in response, the voice-based service may take one or more actions and/or stream voice output back to the device. The actions and/or voice output may vary based on the resources and/or services of the service provider environment, also referred to herein as skills, that are accessible to the device. In various embodiments, the skills provided by the service provider environment may include, for example, scheduling conference calls; identifying a speaker during a conference call; acting as a scheduling assistant; providing calendaring services, recording a meeting; accessing calendars, phone directories, or e-mail; creating, scheduling, and/or modifying tasks; and so on. In one embodiment, some of the devices may be satellite devices that are configured to connect to a central device over a wireless local area network, e.g., to stream voice input to the central device, and the central device may then connect to the service provider environment.

The device detection may be performed by a configuration utility, also referred to as a configuration tool or configuration program, that is executed on a suitable computing device such as a desktop computer, laptop computer, smartphone, or tablet. If the devices are discovered over one or more wireless networks, then due to wireless networking limitations, the detected devices may be located within a particular geographical range of the computing device that runs the configuration utility. In order to be detected, the devices may broadcast a device-specific identifier on the one or more wireless networks. In one embodiment, the devices may be designed to broadcast their identifiers while in a setup mode. In various embodiments, the devices may automatically enter the setup mode prior to registration, or the devices may be individually placed into the setup mode by operation of an administrator or other user. In one embodiment, the identifiers may include a service set identifier (SSID) representing the name of a wireless local area network (WLAN). In one embodiment, the identifiers may include a vendor-specific or device-type-specific component, such as a prefix to the SSID that identifies a vendor of the device or the device type. The configuration utility may analyze the device-specific identifiers and determine which of the devices are deemed suitable for configuration based at least in part on their identifiers. For example, the configuration utility may deem a device to be configurable only if its vendor and/or device type are compatible with the utility and/or if the user of the utility has suitable access privileges to register and configure such devices.

As shown in 820, data indicative of the configurable devices, such as a list or other visualization, may be displayed in a user interface of the configuration utility. The user interface may include one or more interface elements that permit a user to select one or more of the devices. For example, the user interface may list each of the device-specific identifiers for the configurable devices with its own individual checkbox, and potentially with "select all" and/or "deselect all" buttons. As shown in 830, user input may be received through the user interface that represents a selection of a plurality of the configurable devices. The selection may include all of the configurable devices in the vicinity or may instead exclude one or more of them from the selection. In one embodiment, all of the configurable devices may be selected by default, and user input may be received in the configuration utility to accept the default selection. In one embodiment, after receiving the input to select the devices (and potentially after receiving user input to define any configuration parameters to deploy), registration and configuration of the devices may be performed automatically (e.g., without necessarily requiring additional user input) and programmatically (e.g., by execution of program instructions). The user instruction to automatically register and configure a batch of selected devices may be associated with a button or other interface element with a label such as "provision devices" or "configure devices." In various embodiments, the devices may be automatically registered and configured in serial or in parallel, e.g., depending on the ability or inability of the computing device that runs the configuration utility to access more than one of the devices at a time.

As shown in 840, a networking credential may be provided to the selected devices, e.g., by the computing device with the configuration tool. The networking credential may permit the devices to communicate over one or more networks, e.g., with the computing device that executes the configuration utility as well as with components of the service provider environment. In various embodiments, the networking credential may represent a wireless networking credential (e.g., a password to access one or more wireless networks) or wired networking credential (e.g., a password to access one or more wired networks). The networking credential may be deployed to the selected devices by the configuration utility. In various embodiments, the networking credentials may be the same for the devices or may instead vary from device to device, e.g., such that the various networking credentials may be specific to device certificates.

As shown in 850, the selected devices may be registered with one or more entities of a service provider environment.

As discussed above, the devices may be configurable to access one or more cloud-based resources and/or services provided by a service provider environment. For example, a voice-capturing device or smart speaker may be configurable to stream voice input to a network-accessible voice-based service provided by the service provider environment, and in response, the voice-based service may take one or more actions and/or stream voice output back to the device. Registration of a device may include providing a device identifier of an authenticated device to one or more backend services of the service provider environment. In one embodiment, the devices may be associated with individual, device-specific accounts with the service provider environment. The device-specific accounts may be associated with device serial numbers or other globally unique identifiers of the devices. The device-specific accounts may be created in the registration process and may be associated with the devices on a one-to-one basis and not necessarily a particular user. In one embodiment, the device-specific accounts may be distinct or independent from an account associated with the user of the configuration utility, e.g., at the time of their creation. In one embodiment, device-specific credentials associated with the device-specific accounts (e.g., as derived from device certificates) may be distinct or independent from a login credential associated with the user of the configuration utility. In one embodiment, the device-specific accounts may be created or activated during the registration process, e.g., after the user has selected a set of devices to configure. In one embodiment, during or after registration, the device-specific accounts may be assigned to another "umbrella" account, such as corporate account associated with an organizational customer of the service provider environment, e.g., for ease of device management As shown in 860, one or more configuration parameters of a configuration profile may be deployed to the selected devices. The configuration profile may include various parameters such as a networking credential that permits the device to access a local area network, a "wake word" to activate voice capture on detection of audible speech including the word, a time zone, and/or other suitable configuration parameters to be stored on the devices. In one embodiment, the utility may also modify configuration parameters maintained not on the devices but instead in the cloud-based service provider environment, such as a set of "skills" accessible to a voice-capturing device, a particular location associated with a device (e.g., a particular conference room in a particular office building), and so on. In one embodiment, one or more configuration parameters for a device may be provided to the service provider environment and maintained in association with the device-specific account. In one embodiment, the same configuration profile may be deployed for all the selected devices. In one embodiment, different configuration profiles may be deployed for the selected devices, e.g., based at least in part on locations associated with the devices. In one embodiment, all or part of the configuration profile may be provided to a device by a backend service of the service provider environment and not necessarily directly from the configuration tool. For example, the service provider environment may be updated by the configuration tool with the configuration profile associated with a device-specific account, and one or more configuration parameters (e.g., the networking credential, wake word, time zone, and/or other suitable parameters) may be sent to the device from the service provider environment. In one embodiment, the wireless networking credential may be deployed to the devices by the configuration utility, and one or more other configuration parameters may be deployed to the devices by a backend service of the service provider environment. In one embodiment, at least a portion of the configuration profile may be deployed from the service provider environment on request from the device.

The operations shown in 850 and 860 may be performed in any suitable order or in parallel. Using the techniques shown in FIG. 8, many wireless devices may be registered and configured quickly and efficiently in a single batch rather than on a time-consuming individual basis. After batch registration and configuration, the devices may be physically deployed to various locations. For example, the batch of devices may be registered and configured in a centralized location of an office building, and individual devices may then be deployed to different locations within the same building or within other structures affiliated with the same organization. Upon deployment, the devices may be used to access the resources and/or services of the service provider environment, e.g., by capturing voice input and streaming the voice input to a network-accessible voice-based service. As discussed above, the resources and services provided by the service provider environment to voice-capturing devices may include, for example, scheduling conference calls; identifying a speaker during a conference call; acting as a scheduling assistant; providing calendaring services, recording a meeting; accessing calendars, phone directories, or e-mail; creating, scheduling, and/or modifying tasks; and so on.

Figure 9:
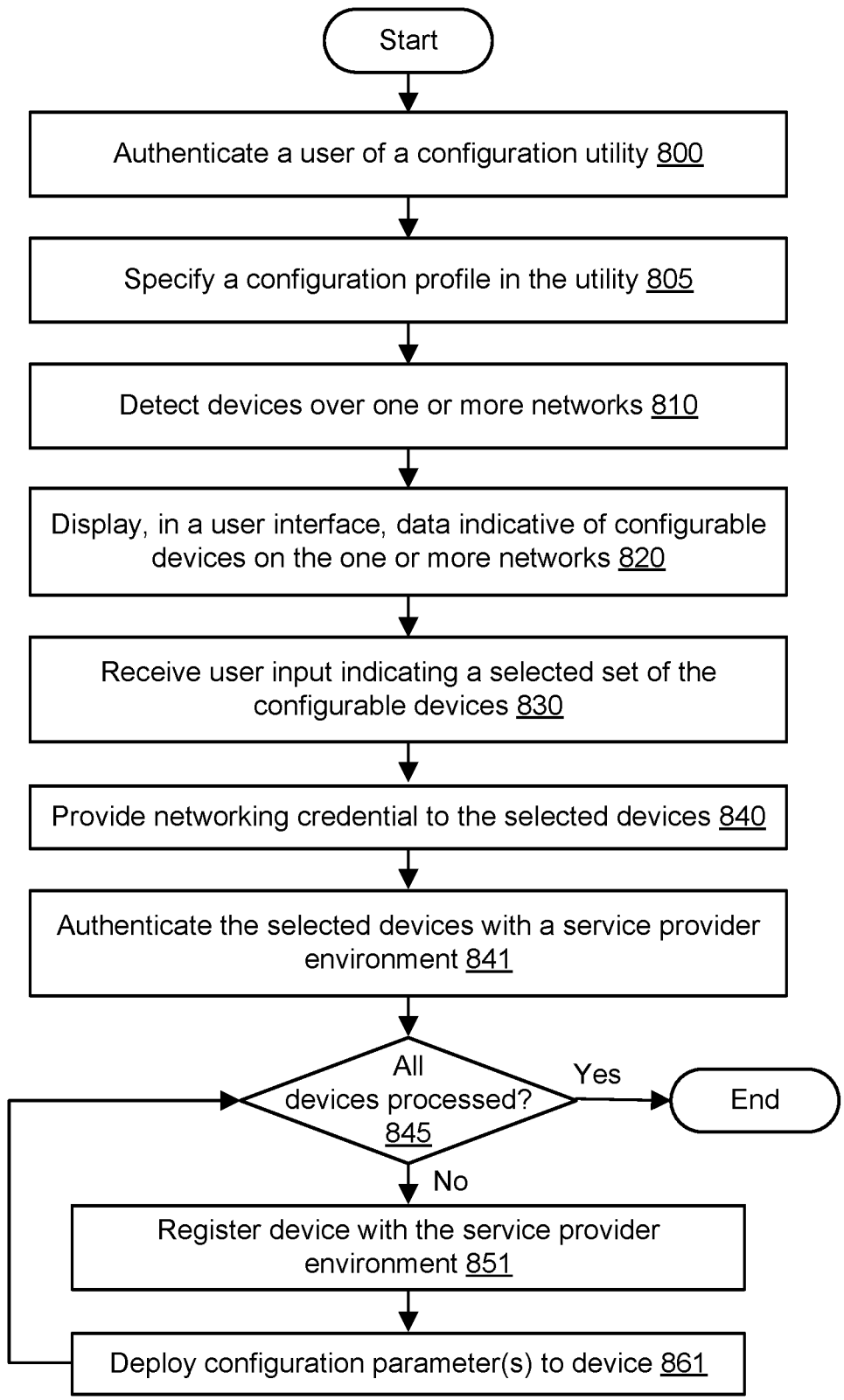
FIG. 9 is a flowchart illustrating further aspects of the method for batch registration and configuration of devices, according to one embodiment.

FIG. 9 is a flowchart illustrating further aspects of the method for batch registration and configuration of devices, according to one embodiment. As shown in 800, a user of a configuration utility may be authenticated such that the user may proceed to register and configure devices in a batch. To authenticate the user, the configuration utility may receive user input representing an access credential (e.g., a password for an account name) and send the credential to a backend service of the service provider environment that may then determine whether the user is entitled to the desired level of access. The user's access credential may be associated with a particular account with the service provider environment.

As shown in 805, a configuration profile may be specified by a user of the configuration utility. The configuration profile may potentially be applicable to multiple devices. In various embodiments, the configuration profile may include information regarding a wireless network (including a password or other credential usable to access the network) as well as device configuration parameters such as a wake word and a time zone. The configuration utility may include a user interface with suitable interface elements allowing a user to define or specify one or more configuration parameters of a configuration profile. In one embodiment, the configuration utility may include a user interface that permits the user to load a previously generated configuration profile. As shown in 810, a set of devices may be detected over one or more networks. As shown in 820, data indicative of the configurable devices, such as a list or other visualization, may be displayed in a user interface of the configuration utility. As shown in 830, user input may be received through the user interface that selects a plurality of the configurable devices. In various embodiments, the configuration profile may be defined or specified at any suitable point during the registration and configuration process, e.g., before or after the devices are detected and selected. As shown in 840, a networking credential device may be sent to the selected devices to permit them to communicate over one or more networks, e.g., with the computing device that executes the configuration utility as well as with components of the service provider environment.

As shown in 841, the selected devices may be authenticated for use with the service provider environment. In one embodiment, the devices may include certificates, e.g., as installed by a vendor of the device and usable to enable access to a service provider environment associated with that vendor. A device may provide its certificate to a backend service of the service provider environment that may then determine whether the device is entitled to access the service provider environment. If the certificate is valid, then the backend service may generate a link code that is usable to register the device for a particular window of time. The backend service may provide the link code for the device to the configuration utility, either directly or by using the device as an intermediary. The configuration utility may proceed with registration and configuration of the device based at least in part on receipt of a valid link code.

As shown in 845, registration and configuration may be automatically attempted for individual devices until all the selected devices have been processed. As shown in 851, a selected device may be automatically registered with a service provider environment as discussed above with respect to 850. As shown in 861, a configuration profile may be automatically deployed to a selected device as discussed above with respect to 860. If registration or configuration fails for any of the devices, the configuration utility may notify the user via the user interface. In this manner, many wireless devices may be registered and configured quickly and efficiently in a single batch rather than on a time-consuming individual basis. After batch registration and configuration, the devices may be physically deployed to various locations.

Illustrative Computer System

In at least some embodiments, a computer system that implements a portion or all of one or more of the technologies described herein may include a computer system that includes or is configured to access one or more computer-readable media. FIG. 10 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of voice-capturing devices; and
one or more processors and one or more memories to store computer-executable instructions that, when executed, cause the one or more processors to:
receive, at the service provider environment receive, at a service provider environment from a computing device, a request to register the plurality of voice-capturing devices for device-specific accounts, wherein the plurality of voice-capturing devices are detected by the computing device over one or more networks and selected by the computing device for configuration as a batch according to one or more configuration parameter values;

register, by the service provider environment, the plurality of voice-capturing devices for the device-specific accounts;

receive, at the service provider environment from the computing device, a device configuration request to deploy at least a portion of respective configuration profiles of the device-specific accounts, wherein at least the portion of the respective configuration profiles are deployed as a batch from the service provider environment to the plurality of voice-capturing devices responsive to the device configuration request; and receive, at the service provider environment from the computing device, at least a portion of the one or more configuration parameter values to be stored as part of the respective configuration profiles of the device-specific accounts.

2. The system as recited in claim 1, wherein the one or more memories store additional computer-executable instructions that, when executed, cause the one or more processors to:

perform, by the service provider environment, authentication of the plurality of voice-capturing devices based at least in part on device-specific credentials, wherein the plurality of voice-capturing devices are registered for the device-specific accounts based at least in part on the authentication.

3. The system as recited in claim 1, wherein the one or more memories store additional computer-executable instructions that, when executed, cause the one or more processors to:

store, by the service provider environment, at least the portion of the one or more configuration parameter values as part of the respective configuration profiles of the device-specific accounts.

4. The system as recited in claim 1, wherein the configuration parameter values are deployed to the plurality of voice-capturing devices by the computing device.

5. The system as recited in claim 1, wherein the one or more configuration parameter values are determined based at least in part on user input to the computing device.

6. The system as recited in claim 1, wherein the one or more configuration parameter values comprise a wake word, wherein at least a portion of the voice-capturing devices are configured to begin capturing voice input based at least in part on detecting the wake word.

7. A computer-implemented method, comprising:

receiving, at a service provider environment from a computing device, a request to register a plurality of voice-capturing devices for device-specific accounts, wherein the plurality of voice-capturing devices are detected by the computing device over one or more networks and selected by the computing device for configuration as a batch according to one or more configuration parameter values;

registering, by the service provider environment, the plurality of voice-capturing devices for the device-specific accounts;

receiving, at the service provider environment from the computing device, a device configuration request to deploy at least a portion of respective configuration profiles of the device-specific accounts, wherein at least the portion of the respective configuration profiles are deployed as a batch from the service provider environment to the plurality of voice-capturing devices responsive to the device configuration request; and receiving, at the service provider environment from the computing device, at least a portion of the one or more configuration parameter values to be stored as part of the respective configuration profiles of the device-specific accounts.

8. The method as recited in claim 7, further comprising:

authenticating, by the service provider environment, the plurality of voice-capturing devices based at least in part on device-specific credentials, wherein the registering is performed based at least in part on the authenticating.

9. The method as recited in claim 7, further comprising:

storing, by the service provider environment, at least the portion of the one or more configuration parameter values as part of the respective configuration profiles of the device-specific accounts.

10. The method as recited in claim 7, wherein the configuration parameter values are deployed to the plurality of voice-capturing devices by the computing device.

11. The method as recited in claim 7, wherein the one or more configuration parameter values are determined based at least in part on user input to the computing device.

12. The method as recited in claim 7, wherein the one or more configuration parameter values comprise a wake word, wherein at least a portion of the voice-capturing devices are configured to begin capturing voice input based at least in part on detecting the wake word.

13. The method as recited in claim 7, wherein the one or more configuration parameter values comprise a time zone associated with the plurality of voice-capturing devices.

14. One or more non-transitory computer-readable storage media storing program instructions that, when executed on or across one or more processors, perform:

receiving, at a service provider environment from a computing device, a request to register a plurality of voice-capturing devices for device-specific accounts, wherein the plurality of voice-capturing devices are detected by the computing device over one or more networks and selected by the computing device for configuration as a batch according to one or more configuration parameter values;

registering, by the service provider environment, the plurality of voice-capturing devices for the device-specific accounts;

receiving, at the service provider environment from the computing device, a device configuration request to deploy at least a portion of respective configuration profiles of the device-specific accounts, wherein at least the portion of the respective configuration profiles are deployed as a batch from the service provider environment to the plurality of voice-capturing devices responsive to the device configuration request; and receiving, at the service provider environment from the computing device, at least a portion of the one or more configuration parameter values to be stored as part of the respective configuration profiles of the device-specific accounts.

15. The one or more non-transitory computer-readable storage media as recited in claim 14, further comprising additional program instructions that, when executed on or across the one or more processors, perform:

authenticating, by the service provider environment, the plurality of voice-capturing devices based at least in part on device-specific credentials, wherein the registering is performed based at least in part on the authenticating.

16. The one or more non-transitory computer-readable storage media as recited in claim 14, further comprising additional program instructions that, when executed on or across the one or more processors, perform:

storing, by the service provider environment, at least the portion of the one or more configuration parameter values as part of the respective configuration profiles of the device-specific accounts.

17. The one or more non-transitory computer-readable storage media as recited in claim 14, wherein the configuration parameter values are deployed to the plurality of voice-capturing devices by the computing device.

18. The one or more non-transitory computer-readable storage media as recited in claim 14, wherein the one or more configuration parameter values are determined based at least in part on user input to the computing device.

19. The one or more non-transitory computer-readable storage media as recited in claim 14, wherein the one or more configuration parameter values comprise a wake word, wherein at least a portion of the voice-capturing devices are configured to begin capturing voice input based at least in part on detecting the wake word.

20. The one or more non-transitory computer-readable storage media as recited in claim 14, wherein the one or more configuration parameter values comprise a time zone associated with the plurality of voice-capturing devices.

* * * * *